United States Patent [19]

Belinkoff

[11] Patent Number: 4,458,140

[45] Date of Patent: Jul. 3, 1984

[54] TEMPERATURE CONTROL APPARATUS FOR CONVECTION OVEN

[75] Inventor: Irving R. Belinkoff, Bellrose Manor, N.Y.

[73] Assignee: Kidde Consumer Durables Corp., Bala Cynwyd, Pa.

[21] Appl. No.: 369,969

[22] Filed: Apr. 19, 1982

Related U.S. Application Data

[63] Continuation of Ser. No. 196,514, Oct. 14, 1980, abandoned.

[51] Int. Cl.³ .............................................. H05B 1/02
[52] U.S. Cl. ................................... 219/497; 219/516; 219/413; 219/494
[58] Field of Search ............... 219/497, 499, 501, 505, 219/508, 516, 494, 400, 413, 412, 10.55 B; 236/15 R, 15 A; 126/19 R; 323/235, 236

[56] References Cited

U.S. PATENT DOCUMENTS 3,548,155 12/1970 Rabindran ........................... 219/499
3,946,200  3/1976 Juodikis .............................. 219/499
4,029,937  6/1977 Russell ................................ 219/497
4,091,266  5/1978 Ito et al. ............................. 219/501
4,217,477  8/1980 Matsubara et al. .......... 219/10.55 B

FOREIGN PATENT DOCUMENTS 2730086 1/1978 Fed. Rep. of Germany ...... 219/516

Primary Examiner—M. H. Paschall
Attorney, Agent, or Firm—Seidel, Gonda & Goldhammer

[57] ABSTRACT

An oven for cooking and/or defrosting food by recirculating heated air is provided with a temperature control means for measuring the actual internal temperature of the food and switching the oven off when the desired temperature is reached. The control includes a temperature sensing device which is insertable into the food for monitoring the actual internal food temperature and a circuit for monitoring the malfunctioning of the sensing device. The monitoring circuit is incorporated into the temperature control and is capable of switching the oven off when a malfunction is detected. The control circuit is also provided with a bypass circuit to allow the oven to be operated without the temperature sensor.

11 Claims, 3 Drawing Figures

TEMPERATURE CONTROL APPARATUS FOR CONVECTION OVEN

This is a continuation, of application Ser. No. 196,514 now abandoned, filed Oct. 14, 1980.

BACKGROUND OF THE INVENTION

Typically temperature controls in countertop ovens; sample and measure the air temperature within the oven cooling chamber during cooking or defrosting a food product. Monitoring of the air temperature in the oven does not take into account that the surface temperature and the internal temperature of the food may differ greatly depending upon the consistency of the food. For example, meat may be warm to the touch and look defrosted on its external surface but in reality is still frozen at its center. Therefore the standard internal air temperature sensing devides of countertop ovens lack the ability to either defrost or cook foods accurately to a desired temperature.

Some countertop ovens, e.g. microwave ovens, have achieved greater temperature control for cooking and/or defrosting by adding a probe-like apparatus with a temperature sensitive device in the probe for use in connection with the temperature control system. While these devices may have accounted for a degree of increased reliability in sensing temperature accurately, none provide for the detection of a malfunction of the temperature sensing element. In addition, most of the probe temperature sensing circuits are used in connection with browning elements to give the food an exterior appearance similar to one achieved in a conventional gas or electric cooking oven.

Most countertop ovens defrost food by using a timing mechanism to control whatever type of heating element is used in that particular oven. This method is not particularly accurate, especially for meat products, because while certain meats may weigh the same their shape and size can vary the amount of time necessary to either defrost or cook such product. Of course, the food product does not have to be meat. The food to be cooked or defrosted may be any one of a variety of foodstuffs such as casseroles, pastries, fish, etc.

SUMMARY OF THE INVENTION

To achieve increased reliability and accuracy in cooking and/or defrosting food in an oven of the convection air-type a low voltage signal temperature control circuit is added to the standard line voltage thermostatic temperature control. In a convection air-type oven, which cooks and/or defrosts food by recirculating heated air, a temperature control means has been added for monitoring the actual internal temperature of the food being cooked and/or defrosted. This temperature control means is operable within a predetermined temperature range from an initial temperature of approximately 32° F. to a desired internal food temperature between 100° to 200° F. The temperature control means comprises a temperature sensing means, a temperature selection means, and circuitry responsive to signals from the temperature sensing means and the temperature selection means for controlling the heating apparatus of the oven.

The temperature sensing means uses a thermistor embedded in the tip of a stainless steel probe which is inserted into the food for measuring the actual internal temperature of that food. The probe is adapted to be removably connected to the oven. When connected to the oven the circuitry responds to the signals from the temperature sensing means and the temperature selection means to control the switching of the oven heating element on or off. If operation of the oven is desired without the probe, the temperature control circuit has means for permitting such operation using the line voltage thermostatic control.

An additional signal indicative of a normally functioning or a malfunctioning temperature sensing means is fed into this circuit so that if the temperature sensing means malfunctions the oven will immediately shut off. While the oven is on, a lamp so indicating is lit. Whenever the oven shuts off the lamp is extinguished and an audible alarm sounds indicating that the oven has shut off.

It is an object of the present invention to provide a low voltage signal circuit which is supplemental to the line voltage temperature control for controlling the cooking and/or defrosting of food stuffs by monitoring their actual internal temperatures.

It is also an object of the present invention to provide such temperature sensing means in the form of a disconnectable probe-like device so as to be able to cook and/or defrost with or without a measurement of the actual internal temperature of the food stuffs being cooked and/or defrosted.

It is an additional object to provide a sensing circuit to detect either a normally functioning or a malfunctioning temperature sensing means and if a malfunction is detected to switch off the oven providing both visual and audible alarms.

It is a further object of the present invention to provide circuit means to enable the oven to remain operable when the temperature sensing means is disconnected and not in use.

Other objects will appear hereinafter.

BRIEF DESCRIPTION OF THE DRAWINGS

For the purpose of illustrating the invention, there is shown in the drawings a form which is presently preferred; it being understood, however, that this invention is not limited to the precise arrangements and instrumentalities shown.

FIGS. 1A and 1B, when mated, provide a complete schematic of the temperature control circuit.

DETAILED DESCRIPTION OF THE INVENTION

Figure 1A:
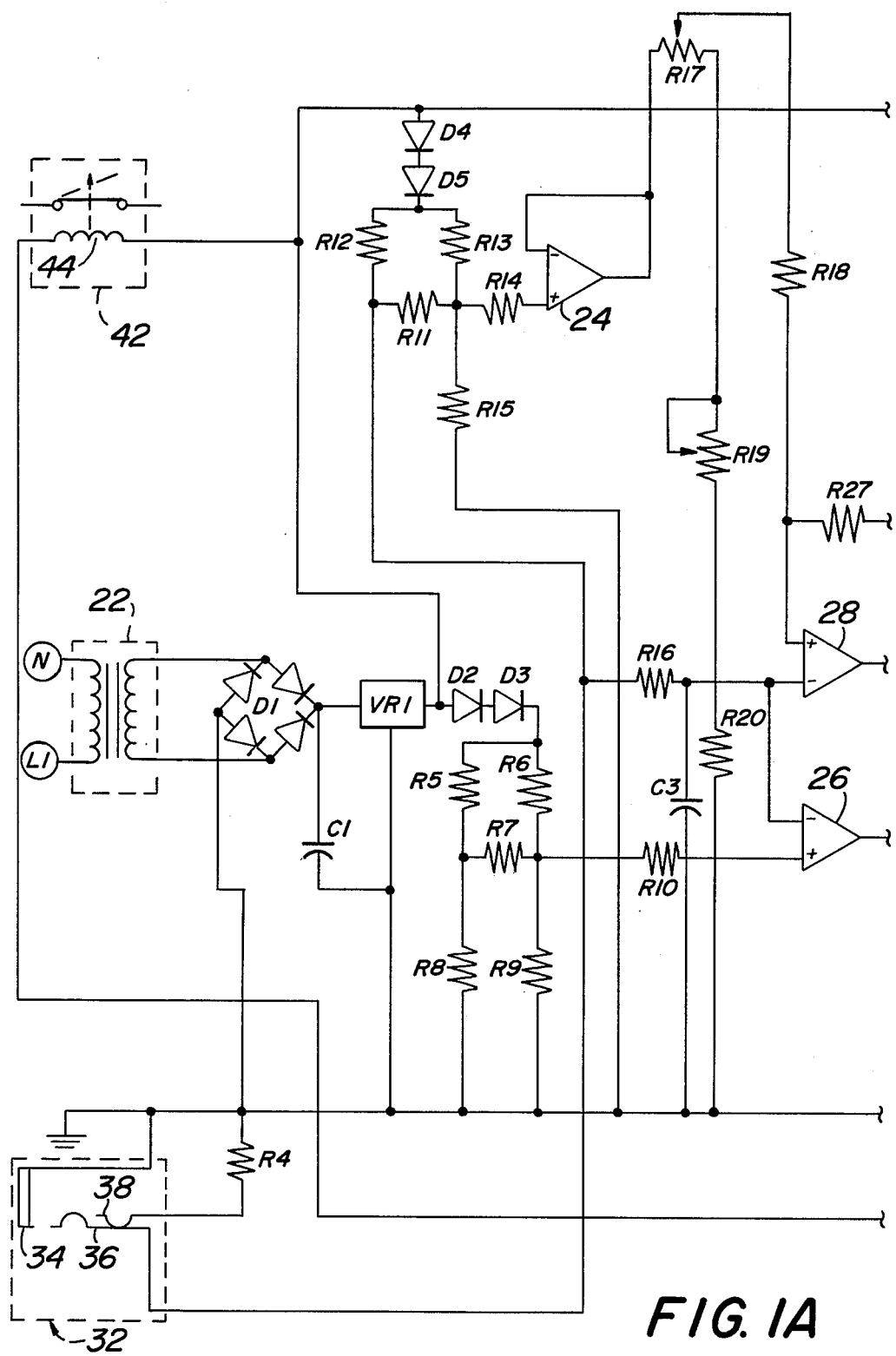
FIG. 1A is a partial schematic drawing of the temperature control circuit of the present invention.

The present invention is best understood by referring to the drawings wherein like numerals indicate like elements. The oven of the present invention may be the oven described in U.S. Pat. No. 3,828,760 which description is hereby incorporated by reference in its entirety.

Figure 2:
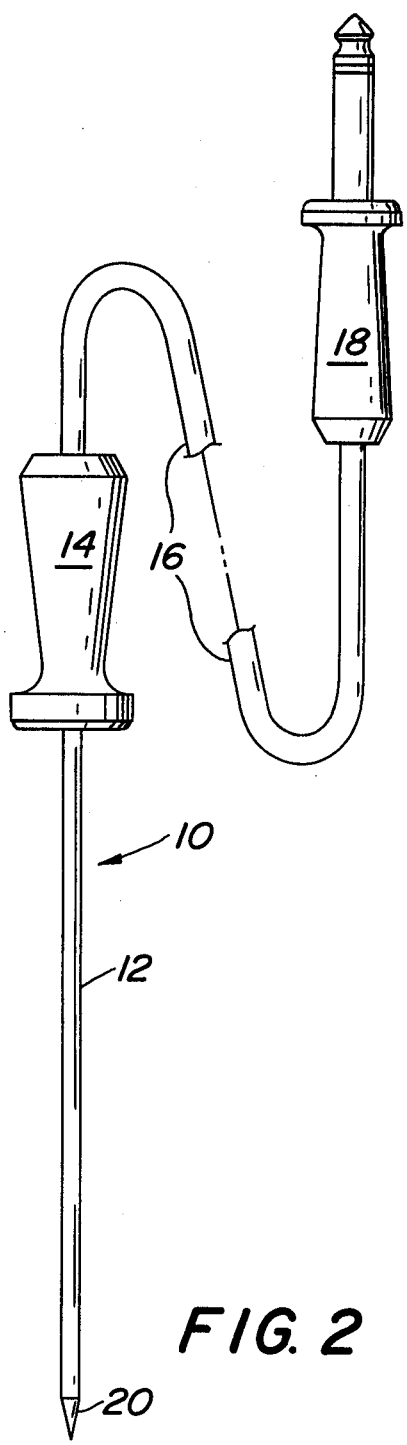
FIG. 2 is a perspective view of the probe-like temperature sensing means, cable and connector of the present invention.

Referring to FIG. 2, the temperature sensing means of the present invention is comprised of a probe-like device 10 comprising a stainless steel probe 12, handle 14, cable 16, and connector 18. The molded parts such as the handle 14 and the connector 18 and the outer jacket of the cable 16 are made from materials which are FDA approved for use in food preparing apparatus and capable of continuous operation at 450° F. Any suitable material meeting these conditions could be used to form the above listed elements of the probe. The outer insulation of the cable 16 should have a thickness to withstand normal household use and able to withstand closure in an oven door without loss of operation. The cable 16 should measure approximately 11½ inches between the handle 14 and the connector 18 to allow for partially removing the food from the oven without disconnecting the probe. The external sleeving or outer jacket of the cable 16 should be secured to both the connector 18 and the handle 14 to prevent the sleeving from riding up over the conductors in the cable.

The stainless steel probe 12 is a hollow tube tapering at one end to a point 20. Mounted internally of the point 20 is a temperature sensitive device such as a thermistor capable of withstanding 450° F. for at least one hour without loss of operation. The temperature sensitive device is electrically and mechanically fastened to the internal surface of the tip 20 of the stainless steel probe 12 so as to be able to respond to temperature changes of the outside environment. The temperature sensitive device or thermistor is electrically connected to a signal wire within the cable 16 using high temperature solder.

The cable 16 is provided with a braided outer shield to minimize rf signal pick up and is fed through the handle 14 to be electrically and mechanically attached to the probe 12. The opposite end of the cable 16 is connected to the connector 18 by fastening the braided shield of the cable to the barrel or ground strap and the signal wire to the tip of the connector 18.

The entire assembly, probe and connector should be made of material sufficiently unbreakable as to withstand drops from a height of 4 feet to a plastic tile floor over cement and be sealed against water or other liquid immersion and moisture penetration such as during normal household cleaning including being placed in a dishwasher.

The connector 18 is configured to plug into a mating receptacle which may be located at any point along the side walls of the oven but preferably at a location just inside the door on the right side panel toward the top of the opening. The receptacle 32, shown only in the schematic in FIG. 1A, is connected directly to the temperature control circuit associated with the probe.

Figure 1B:
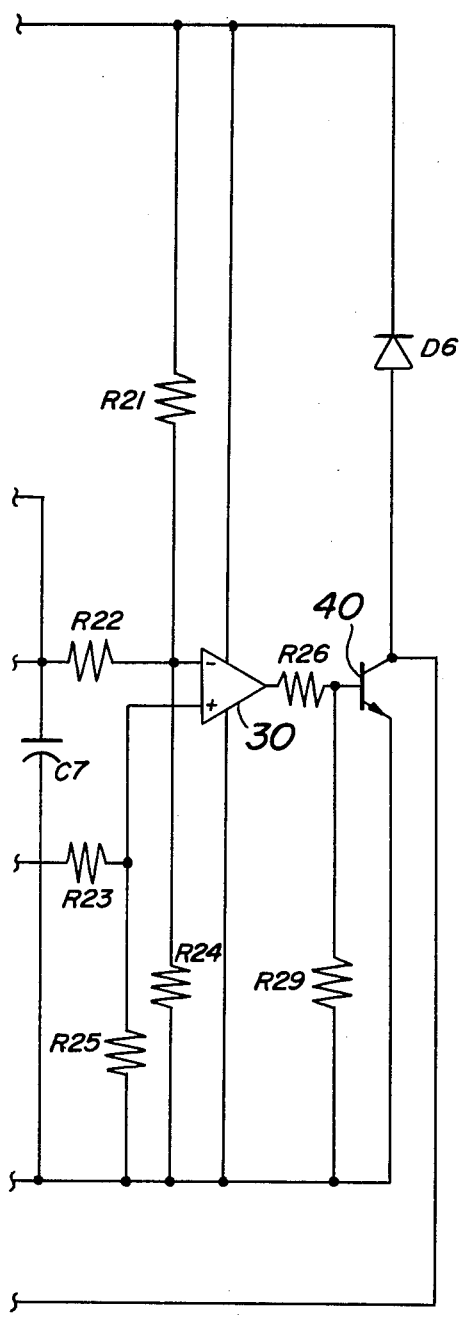
FIG. 1B is a partial schematic drawing of the remainder of the temperature control circuit of the present invention.

Referring now to FIGS. 1A and 1B, the temperature control circuit illustrated therein operates at a low voltage, 12 volts dc, rather than at line voltage as typical thermostatic controls in countertop ovens. The circuit receives its power from a transformer 22 with its primary winding connected to line voltage of approximately 120 volts ac. The transformer secondary winding provides 17 volts ac to a full wave rectifier D1. The full wave rectifier D1 provides 17 volts dc to a voltage regulator VR1 which provides a fixed output voltage of 12 volts dc to the circuit. The voltage regulator may be any fixed output voltage type integrated circuit device currently available which will provide the desired voltage. The ground leg of the regulator is in parallel with a capacitor C1 having a value of 470 uf, for eliminating transients at the output of the rectifier. At the output of voltage regulator VR1 the circuit is divided into separate paths.

The first path proceeds through diodes D2, D3 and continues across the resistive bridge network comprised of resistors R5, R6, R7, R8 and R9. These resistors have values of 10K, 10K, 30K, 30K, and 470K ohms, respectively. The resistive network establishes a reference voltage of 10.6 volts at the junction of R6, R7 and R9. The path continues through resistor R10 having a value of 1K ohms to the non-inverting input of differential amplifier 26 to be more fully described hereinafter.

The second path from the voltage regulator VR1 proceeds through diodes D4, D5 to another resistive bridge network. The resistive bridge network comprises resistors R11, R12, R13, and R15. The values for these resistors are 29.4K, 10.2K, 10.2K, and 29.4K ohms, respectively. These resistors are selected to vary only ±1% from their stated value. This resistive bridge network provides a voltage of 7.9 volts at the junction of R11, R13, R14 and R15. Resistor R14 has a value of 1K ohms and is connected to the noninverting input of the operational amplifier 24.

The probe assembly 10 is connected to the temperature control circuit by receptacle 32. The shield of cable 16 is connected to the collar 34 and grounded. The conducting wire from the thermistor is connected to the spring contact 36 through the tip of the connector 18. Fixed contact 38 of the receptacle 32 is connected through resistor R4, having value of 100K ohms, to ground. The relationship between the spring contact 36 and the fixed contact 38 is such that when connector 18 is not present and the probe assembly 10 is detached from the oven resistor R4 connects the junction of R11, R12 of the resistive bridge network R11–R15 to ground. When the probe assembly 10 is inserted into the receptacle 32 spring contact 36 moves away from fixed contact 38 by the force of the tip of connector 18 isolating resistor R4 and placing the thermistor with its variable resistance into the circuit. The specific function of resistor R4 will be more fully described hereinafter.

The circuit includes four operational amplifiers 24, 26, 28 and 30, each connected as a differential amplifier. The first differential amplifier 24 has a feedback loop connecting its output to its inverting input. Such configuration makes the differential amplifier 24 a voltage follower with unitary gain providing an output voltage equal to the input voltage. Therefore, the voltage of 7.9 volts is passed along the output path from the differential amplifier 24 to the temperature selection means comprising potentiometer R17. There is little if any voltage drop across resistor R14 because of the high input impedence of amplifier 27.

Potentiometer R17 has a variable resistance between 0 and 20K ohms and is connected in series with trim resistor R19 and resistor R20 to ground. Potentiometer R17 is connected so as to make the voltage across it proportional to the temperature scale of the temperature control knob. Variable trim resistor R19 having a value of 10K ohms, is used to calibrate potentiometer R17. Resistor R20 has a value of 15K ohms. Adjusting the potentiometer R17 gives rise to a voltage drop across R18, such that the voltage at the non-inverting input of differential amplifier 28 is in the range of 4 to 7.9 volts. Resistor R18 has a value of 20K ohms.

While the signal wire from the thermistor is connected through the contact 36 to the R11, R12 junction in the resistive network comprising resistors R11–R15, it is also connected through resistor R16, having a value of 1K ohms, to the inverting inputs of differential amplifier 26, 28. Capacitor C3, having a value of 0.01 uf, is connected between the non-inverting input of differential amplifier 28 and ground in order to provide a time delay for reducing any possible relay chatter.

Considering first differential amplifier 28, the voltage from the temperature selection means resistor R17 having a range between 4 to 7.9 volts is applied to its non-inverting input. A voltage proportional to the resistance of the thermistor, slightly delayed by the R-C time delay network of R16, C3 appears at the inverting input of the differential amplifier 28. A feedback resistor R27 having a value of 20M ohms is connected between the output of differential amplifier 28 and its non-inverting input. Differential amplifier 28 will provide an output voltage having a range between 0.64 and 10.8 volts depending upon the difference value between its inputs. If the thermistor voltage signal to the inverting input exceeds the pre-set temperature voltage signal to the non-inverting input the lower range value will be outputted. If the value of the non-inverting input exceeds the value of the inverting input a voltage value will be outputted from the differential amplifier 28 ranging upwards toward the upper limit of the range. The value of 10.8 volts will occur at the output of the differential amplifier 28 when the two inputs experience a maximum differential in value.

Another capacitor C7, having a value of 100 uf, is connected between the output of differential amplifier 28 and ground for creating a second time delay to allow any transient voltages produced through differential amplifier 28 to settle out. The output voltage is connected through a voltage divider network having resistors R21, R22, and R24. These resistors are all valued at 15K ohms. The voltage divider network serves the purpose of isolating and stabilizing the input voltage to the inverting input of differential amplifier 30.

Referring now to differential amplifier 26 whose inverting input is connected in parallel to the inverting input of differential amplifier 28, this differential amplifier serves as a probe sensing circuit to detect malfunctioning of the thermistor. The reference voltage set by the resistive network having resistors R5–R9 and passing through resistor R10 is applied to the non-inverting input of differential amplifier 26. Thus a voltage of 10.6 volts appears on the non-inverting input and a variable voltage depending upon the presence or absence of the probe and the value of the thermistor appears on the inverting input. If the voltage value on the non-inverting input of differential amplifier 26 exceeds the voltage value on the inverting input a voltage of 10.6 volts will be outputted signifying that the probe is present and the thermistor has a resistance value within its normal operating range. If the voltage value on the inverting input exceeds the voltage value on the non-inverting input the differential amplifier 26 will output 0 volts. Thus, the differential amplifier 26 acts as a logic gate for determining the status of the thermistor. The output of differential amplifier 26 is connected through resistor R23 having a value of 15K ohms to the non-inverting input of differential amplifier 30. The non-inverting input of differential amplifier 30 is also tied to ground through resistor R25 having a value of 22K ohms. The purpose of resistor R25 is to stabilize the output of differential amplifier 26 by reducing transients and providing a stable voltage level to the input of differential amplifier 30.

Differential amplifier 30 acts in a similar manner to differential amplifier 26 by comparing the voltage value of the non-inverting input to the voltage value of the inverting input. If the value of the non-inverting input exceeds the voltage value of the inverting input a voltage of 10.6 volts will be outputted. If the voltage value of the inverting input exceeds the voltage value of the non-inverting input the differential amplifier 30 will switch and output 0 volts. The output voltage from differential amplifier 30 controls the transistor switch 40 which in turn controls the relay 42. The output voltage of differential amplifier 30 is reduced through resistor R26 having a value of 4.7K ohms to provide a correct $V_{be}$ for the transistor 40. The output voltage through the resistor R26 is stabilized by connecting resistor R29 having a value of 2.2K ohms from the base connection on the transistor 40 to ground. The diode D6 acts as a voltage clamp to protect the transistor 40. The transistor may be any of the NPN type transistors which are capable of switching 12 volts. The collector of the transistor 40 is connected through the coil 44 of the relay 42 to the voltage regulator VR1. The emitter of the transistor 40 is connected to ground. When switched on the transistor 40 will permit the coil 44 to conduct thereby latching the relay and permitting the heating element of the oven to heat the air and cook and/or defrost the food located within the cooking chamber.

The oven of the present invention operates by switching an oven timer switch to either constant or timed on. This timer switch provides the return voltage path through the relay 42 for the line voltage applied through the heating element and the thermostatic control measuring oven air temperature. The oven thermostatic control monitors the air temperature in the cooking chamber in order to cycle the heating element on and off while the motor constantly recirculates the air as described in U.S. Pat. No. 3,828,760. The recirculating of the heated air and the cycling on and off of the heating element will continue throughout either the constant or timed oven on period provided by the oven timer switch.

The present invention also provides for a supplementary temperature control circuit for monitoring the actual internal temperature of the foodstuff being cooked and/or defrosted in the cooking chamber. This supplementary temperature control circuit, using the thermistor embedded in a probe tip inserted into the foodstuff, is capable of overriding the thermostatic control and the timer by using the relay 42 in order to shut the oven off when the food reaches the desired temperature. When such temperature is reached the probe temperature selection circuit switches off transistor 40 rendering relay coil 44 non-conductive thus allowing relay 42 to return to its normally open condition. When relay 42 opens the oven heating element, motor and lamp indicator are shut off and an audible alarm begins to sound until the oven timer switch is returned to off. If it is desired to cook and/or defrost a particular food without using the probe temperature sensing device 10 the probe temperature control circuit is provided with a resistor R4 which provides for a voltage sufficient to enable the transistor switch 40 to remain on allowing relay coil 44 to conduct so that the thermostatic control and the oven timer will control both the oven temperature and length of cooking time.

The probe temperature control circuit is operable in two modes: with the probe inserted and with the probe detached. With the probe inserted resistor R4 is isolated and the thermistor embedded in the tip 20 of the probe 12 provides the variable resistance giving rise to a range of voltages. It should be noted that the material from which the thermistor is made decreases in resistive value as the temperature increases and vice versa. It is also important to realize that the thermistor must function within a temperature range between approximately 32° F. and 212° F. or a temperature equivalent to boiling. The resistance exhibited by the thermistor at different temperatures within the range will vary proportionately in a decreasingly linear fashion as temperature increases. As an example of the operation of the probe temperature control circuit with the probe inserted assume that the probe temperature selection control, potentiometer R17, has been set at 150° F. Further, the actual internal temperature of the food is approaching 150° F. and, therefore, the thermistor would be approaching 10.2K ohms. The thermistor would provide a signal voltage of approximately 5.8 volts which is applied to the inverting inputs of differential amplifiers 26, 28. With the temperature selection control, potentiometer R17, set at its midrange value of 150° F. a voltage of approximately 5.95 volts will appear at the non-inverting input to differential amplifier 28. Since the voltage value of the non-inverting input of differential amplifier 28 exceeds the voltage value of the inverting input a signal of approximately 10.8 volts will be outputted through resistor R22 and voltage divider R21, R24 and appear at the inverting input of differential amplifier 30 as approximately 7.6 volts. The differential amplifier 26 having a voltage value of approximately 5.8 volts on its inverting input and a voltage value of 10.4 volts on its non-inverting input will output a voltage of approximately 10.6 volts indicating that the probe is functioning normally. The output voltage of 10.6 will appear at the non-inverting input of differential amplifier 30 as approximately 6.4 volts. The input signal voltage value on the inverting input of differential amplifier 30 as it approaches 7.6 volts becomes sufficient to switch the output of the differential amplifier from its high of 10.6 volts to its low of 0 volts thus switching off the transformer switch 40. As the inverting input of differential amplifier 30 approaches the voltage value of 7.6 volts the closer the actual internal food temperature is to the selected temperature of 150° F. Therefore as the 150° F. temperature is achieved the transistor switch 40 ceases to conduct by being deprived of its base voltage which in turn renders the coil 44 non-conductive releasing the relay armature and shutting off the oven heating element, motor and lamp.

If the food being cooked and/or defrosted is not capable of having its internal temperature measured by the probe or the use of the probe is not desired it may be detached from the receptacle in the oven wall thus returning resistor R4 to the circuit. Resistor R4 provides a fixed voltage of 9.6 volts for no probe operation of the oven. Therefore 9.6 volts will be applied to both inverting inputs of differential amplifiers 26, 28 resulting in a voltage output from differential amplifier 26 of the same 10.6 volts signifying normal functioning of the probe and a voltage of 0.64 volts from differential amplifier 28. The non-inverting input to differential amplifier 30 will remain at 6.4 volts and the inverting input will have a value of 4.25 volts when no probe is present in the oven. This makes the output of differential amplifier 30 go high to 10.6 volts thus creating a sufficient base to emitter voltage for the transistor 40 to switch on. With transistor 40 on, the coil 44 will conduct latching the armature of relay 42 and rendering the oven heating element, motor and lamp susceptible to control by the thermostatic control and the oven timer switch.

Thus, the probe temperature control circuit of the present invention provides for the temperature sensing of the actual internal temperature of the food being cooked and/or defrosted in the cooking chamber of the oven. The circuit also provides for a probe sensor to monitor either the normal functioning or the malfunctioning of the thermistor embedded in the probe tip. If the thermistor exceeds the preselected resistance range the sensor will change outputs signifying such malfunction. The change in output will cause a transistor switch to turn off allowing a relay to spring back to its normally open position turning off the oven and initiating an audible alarm.

If it is desired to operate the oven without the probe the detaching of the probe from its receptacle in the wall of the oven will not render the oven temperature control circuit inoperative. A provision has been made to enable the probe temperature control circuit to continue in operation keeping the transistor switch turned on in order to retain the relay in its latched position to allow the oven to be susceptible to control by the thermostatic temperature control and the oven timer.

The present invention may be embodied in other specific forms without departing from the spirit or essential attributes thereof and, accordingly, reference should be made to the appended claims, rather than to the foregoing specification, as indicating the scope of the invention.

I claim:

1. An oven for preparing food by circulating heated air, said oven including apparatus for controlling the internal temperature of the food being prepared to a desired temperature by switching the air heating element on or off, comprising:
    (a) means for sensing the internal temperature of the food,
    (b) reference circuit means responsive to the sensing means for generating a reference voltage representative of one extreme of a range of temperature values, the reference circuit means including a resistive voltage divider circuit, one leg of which includes the sensing means, and a voltage follower circuit,
    (c) means responsive to the reference circuit means for adjustably selecting from a range of values a single temperature value within the limits of said range and indicative of a desired internal food temperature,
    (d) first analog circuit means for comparing the sensed internal food temperature to the selected temperature and generating an analog signal proportional to the difference between the sensed and selected temperatures,
    (e) second circuit means for comparing the sensed internal food temperature to a fixed reference and generating a signal indicative of proper operation of the temperature sensing means,
    (f) third circuit means for generating a switch control signal in response to the signals generated by the first and second circuit means,
    (g) switch means responsive to the switch control signal for switching the air heating element on or off, whereby the heating element will be switched on until the temperature difference signal attains a predetermined value indicative of the internal temperature being equal to the selected temperature or until the temperature sensing means malfunctions, and
    (h) circuit means for maintaining the air heating element in the on state when the probe is detached from the oven, and thermostat means for sensing the temperature of said heated air and switching said air heating element off when said heated air attains a predetermined temperature.

2. An oven as in claim 1 wherein the temperature sensing means is a thermistor embedded in the tip of a probe insertable in the food being prepared.

3. An oven as in claim 2 wherein the probe is detachably connected to the oven.

4. An oven as in claim 1 wherein the means for adjustably selecting the temperature indicative of a desired internal food temperature is a variable resistor.

5. An oven as in claim 4 wherein the variable resistor is scaled to control the desired internal food temperature over the range of approximately 32° F. to approximately 200° F.

6. An oven as in claim 1 wherein the first analog circuit means includes a differential amplifier, the inverting input of which receives a signal which is the output of the temperature sensing means, the non-inverting input of which receives a signal which is the output of the temperature selecting means, and the output of which is a signal proportional to the difference between the sensed temperature and the selected temperature.

7. An oven as in claim 1 wherein said second circuit means includes an operational amplifier, the inverting input of which receives a signal which is the output of the temperature sensing means, the non-inverting input of which receives a signal of fixed voltage, and the output of which is a first and a second state depending on the function of the temperature sensing means, the first state indicative of proper function of the temperature sensing means and the second state indicative of improper function of the temperature sensing means.

8. An oven as in claim 1 wherein said third circuit means includes an operational amplifier, the inverting input of which receives a signal which is the output of the first analog circuit means, the non-inverting input of which receives a signal which is the output of the second circuit means, and the output of which is the switch control signal having a first state and a second state depending upon the state of the output of the second circuit means, the output of the third circuit means being in the first state when the output of the second circuit means is in the first state and the output of the third circuit means being in the second state when the output of the second circuit means is in the second state.

9. An oven as in claim 1 wherein the switch means includes a transistor in series with a coil of a relay, the transistor rendering the relay coil conductive or non-conductive in response to the switch control signal, the contacts of the relay providing the conduction path of the air heating element.

10. An oven as in claim 3 further comprising circuit means for maintaining the air heating element in the on state when the probe is detached from the oven, the circuit means comprising a spring contact which is in its relaxed state when the probe is detached, the spring contact completing a circuit path to provide a fixed voltage to the first and second circuit means, and thermostat means for sensing the temperature of said heated air and switching said air heating element off when said heated air attains a predetermined temperature.

11. An oven for preparing food by circulating heated air, said oven including apparatus for controlling the internal temperature of the food being prepared to a desired temperature by switching the air heating element on or off, comprising:

(a) means for sensing the internal temperature of the food, said sensing means being a thermistor embedded in the tip of a probe insertable in the food being prepared, said probe being detachably connected to the oven;

(b) reference circuit means responsive to the sensing means for generating a reference voltage representative of one extreme of a range of temperature values, the reference circuit means including a resistive voltage divider circuit, one leg of which is the thermistor, and a voltage follower circuit;

(c) means responsive to the reference circuit means for adjustably selecting from a range of values a single temperature value within the limits of said range and indicative of a desired internal food temperature;

(d) first analog circuit means for comparing the sensed internal food temperature to the selected temperature and generating an analog signal proportional to the difference between the sensed and selected temperatures, said first circuit means including a differential amplifier, the inverting input of which receives a signal which is the output of the temperature sensing means, the non-inverting input of which receives a signal which is the output of the temperature selecting means, and the output of which is a signal proportional to the difference between the sensed temperature and the selected temperature;

(e) second circuit means for comparing the sensed internal food temperature to a fixed reference and generating a signal indicative of proper operation of the temperature sensing means, said second circuit means including an operational amplifier, the inverting input of which receives a signal which is the output of the temperature sensing means, the non-inverting input of which receives a signal of fixed voltage, and the output of which is a first and second state depending on the function of the temperature sensing means, the first state indicative of proper function of the temperature sensing means and the second state indicative of improper function of the temperature sensing means;

(f) third circuit means for generating a switch control signal in response to the signals generated by the first and second circuit means, said third circuit means including an operational amplifier, the inverting input of which receives a signal which is the output of the first circuit means, the non-inverting input of which receives a signal which is the output of the second circuit means, and the output of which is the switch control signal having a first state and a second state depending upon the state of the output of the second circuit means, the output of the third circuit means being in the first state when the output of the second circuit means is in the first state and the output of the third circuit means being in the second state when the output of the second circuit means is in the second state;

(g) switch means responsive to the switch control signal for switching the air heating element on or off, whereby the heating element will be switched on until the temperature difference signal attains a predetermined value indicative of the internal temperature being equal to the selected temperature or until the temperature sensing means malfunctions, said switch means including a transistor in series with a coil of a relay, the transistor rendering the relay coil conductive or non-conductive in response to the switch control signal, the contacts of the relay providing the conduction path of a heating element; and (h) circuit means for maintaining the heating element in the on state when the probe is detached from the oven, said circuit means comprising a spring contact which is in its relaxed state when the probe is detached, the spring contact completing a circuit path to provide a fixed voltage to the first and second circuit means, and thermostat means for sensing the temperature of said heated air and switching said air heating element off when said heated air attains a predetermined temperature.

* * * * *